Dec. 16, 1969  T. W. MOORE  3,484,702
VOLTAGE SENSITIVE AND HARMONIC CONTROL CIRCUIT
Filed June 9, 1965
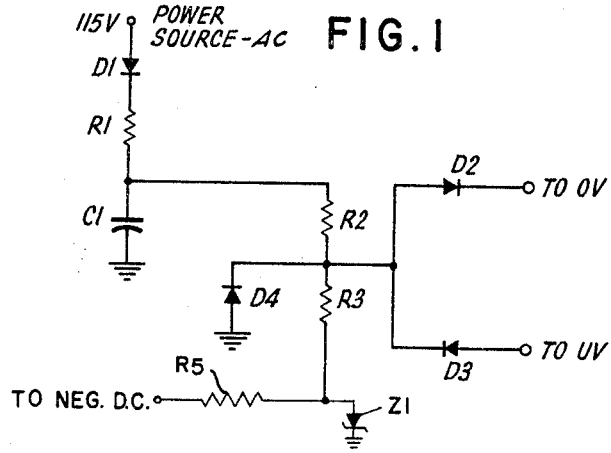
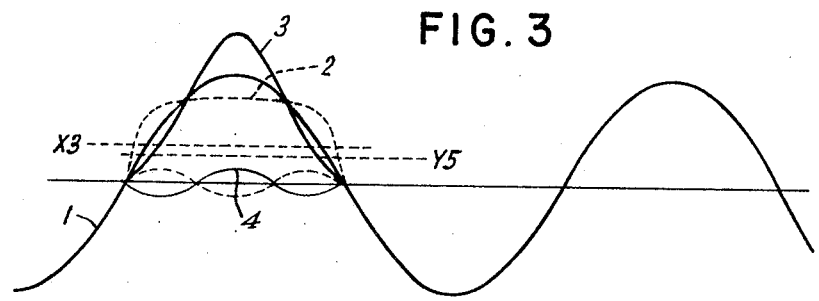
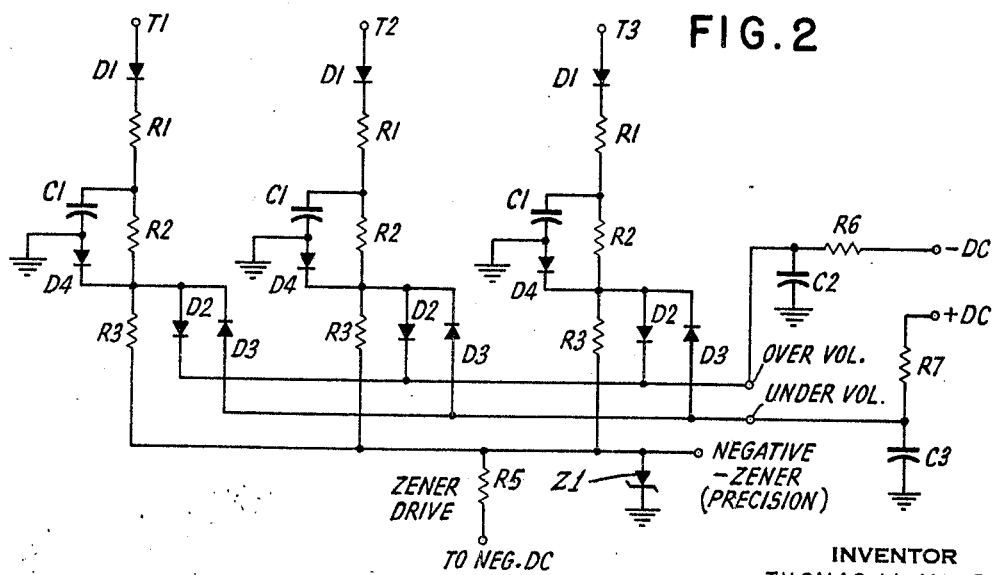
INVENTOR
THOMAS W. MOORE
BY
Stewart F. Moore
ATTORNEY United States Patent Office 3,484,702
Patented Dec. 16, 1969

3,484,702
VOLTAGE SENSITIVE AND HARMONIC CONTROL CIRCUIT
Thomas William Moore, Dayton, Ohio, assignor to American Machine & Foundry Company, a corporation of New Jersey
Filed June 9, 1965, Ser. No. 462,480
Int. Cl. H03k 5/20
U.S. Cl. 328—116          1 Claim

ABSTRACT OF THE DISCLOSURE

A frequency and waveform insensitive circuit for sensing an AC voltage and providing an output when the sensed voltage varies from a predetermined value having rectifying means connected through a portion of a resistance means for producing a positive charge on a capacitance in response to the sensed voltage, a source of negative DC reference voltage, and the values of the resistance and capacitance being relatively proportioned to provide no analog output when the sensed AC voltage is at the predetermined value.

---

The invention relates to power monitoring systems and particularly to voltage sensing circuits or sensors and the associated harmonic control circuits used in such systems.

The devices of the prior art used for voltage sensing have a number of serious defects. For example, their performance is often adversely affected by variations in the frequency and wave form of the power source being monitored. Also, many of these devices in the prior art employ transformers, magnetic devices or other components which are subject to shifts in performance due to characteristics introduced by the process by which they were produced; and also may be relatively expensive and of large size and weight, which makes their use undesirable in power monitoring systems in which portability, low space requirements and low cost are important factors. In the case of a multi-phase source of power, such as a 3-phase alternating current source, for energizing unbalanced loads, differences in the voltage levels of each of these phases relative to neutral may unduly affect the operation of certain critical load equipment or contribute a progressive or immediate damage to same.

A general object of the invention is to overcome the above-mentioned deficiencies of prior art voltage sensors.

Another object is to provide an accurate voltage sensor device which does not employ transformers, magnetic devices or other components subject to shifts in performance in use.

Another object is to provide a voltage sensor in a simple circuit configuration using components which are stable in operation and having low weight and small space requirements.

A more specific object is to provide a voltage sensor for use in a power monitoring system in which the determination of the variation in voltage is independent of variations in frequency of the AC power source being monitored and is unaffected by harmonics of the fundamental wave of the power source.

These objects are obtained in accordance with the invention by a simple circuit adapted for connection across an alternating current power source, or each phase of a multi-phase alternating current source, utilizing a plurality of diodes, a capacitor and associated resistance means to produce the DC analog of the signals from the power source; to compare this with a negative reference voltage level established, for example, by a negative Zener diode, so as to provide a net output at a given output point on the resistance means for subsequent connected logic circuits which is relatively unaffected by both frequency and waveform of the power source; to proportion the elements of this circuit so that the potential of a given point is close to zero for the predetermined voltage of the power source, and to pole the output diodes so that they are responsive to the changed potentials at the given points caused by increase or decrease in the voltage of the power source from the predetermined value. To reduce the effect of harmonics, the third and fifth harmonics are effectively eliminated from the applied voltage wave by proportioning the elements in each analog circuit and the reference voltage to maintain a relatively-constant, selected charge on the capacitors, thus leaving the residue of the wave for the voltage sensing functions as hereinafter described.

A feature of the invention is the use of this voltage sensor in connection with a multi-phase AC power source for energizing an unbalanced load, and to compensate for the differences in voltage level of the several phases by monitoring the highest of the phase voltages to perform the overvoltage sensing function and the lowest of the phase voltages to perform the undervoltage sensing function; and making the levels of the output signals independent of the remaining phases for both sensing functions.

These and other objects and features of the invention will be better understood from the following detailed description thereof when it is read in conjunction with the accompanying drawing in which:

FIGURE 1 shows a circuit schematic of the basic voltage sensor in accordance with one modification of the invention applied to an alternating current voltage source for producing the DC analog of the output signals and the arrangements for connecting overvoltage and undervoltage logic circuitry thereto in proper manner;

FIGURE 2 shows circuit elements identical with those shown in FIGURE 1, applied to each of the three phases of a 3-phase alternating current power source, and a parallel arrangement for connecting all of the produced DC analog voltage circuits to overvoltage and undervoltage logic circuitry.

FIGURE 3 shows curves used to illustrate how the third and fifth harmonics of the AC source may be effectively eliminated by controlling the selected charge on the filter capacitors of FIGS. 1 and 2.

In the circuit of FIG. 1, the basic voltage sensing circuit includes an input portion comprising a diode D1 poled in the direction shown, a resistor R1 and a capacitor C1 in series, which portion is adapted for direct connection across an alternating current power source, say of 115 volts AC. A circuit including two resistors R2 and R3 in series form a voltage divider which is connected between the junction of R1 and C1 in the input portion and a negative reference voltage source provided, for example, by a negative Zener diode Z1 of suitable value. In the output portion of this circuit, the anode of a second diode D2 is connected to the junction between resistors R2 and R3 and its cathode is connected to a circuit designated OV for detecting the variation in voltage of the power source above a predetermined value. The cathode of a third diode D3 is connected to the junction of R2 and R3 and its anode is connected to a circuit designated UV for detecting variations of the voltage of the power source below the predetermined value. The cathode of a fourth diode D4 is also connected to the junction between resistors R2 and R3 and its anode is connected to ground. The circuit of FIG. 1 produces the DC analog of the voltage of the power source and supplies it through D2 and D3 to the logic overvoltage and undervoltage detection circuits OV and UV, respectively, for detecting variations in the voltage at the junction of R2 and R3 above and below a predetermined value.

FIGURE 2 shows the basic sensor circuit for sensing variations in each of the phase voltages of a 3-phase alternating current power source from a predetermined value.

In that figure, each of the phase terminals T1, T2 and T3 of the 3-phase source is connected through a circuit identical to that shown in FIG. 1, comprising a capacitor C1, resistors R1, R2 and R3 and diodes D1 to D4, in parallel to an overvoltage detection circuit OD and an undervoltage detection circuit UV. One end of the resistor R3 of the voltage divider in each of these circuits, the other end of which is connected to the junction between capacitor C1 and resistor R1 in the input portion, is connected to a common negative voltage reference source formed by a common negative Zener diode Z1 and a Zener drive resistor R5 connected to a negative DC source, and the fourth diode D4 in each circuit is connected to ground. An input capacitor (C2, C3) and an associated resistor (R6, R7) is connected in the overvoltage circuit OV and the undervoltage circuit UV, respectively.

To reduce the significance of the wave form of the voltage source on the voltage detection, each of the capacitors C1 in the circuits of FIGS. 1 and 2 are charged to a value which is selected on the basis of considerations shown in the curves in FIG. 3. In the latter figure, the solid line designated 1 is a sine wave representing the fundamental wave of the frequency of the 115 volt voltage source shown in FIG. 1, or each phase of a 3-phase source shown in FIG. 2, respectively. In dotted line designated 2, it is seen that a third order harmonic starting off in step with the fundamental wave results in a total voltage which begins to approximate a square wave. As against this, if the harmonic level is inverted and started off out of step with the fundamental, it tends to produce a triangular wave front, such as shown by the curve 3. In each case the harmonic level is the same, but its time significance or number of half waves or cycles with respect to the fundamental determines the basic shape of the output wave form, as shown by the signals represented by the curves designated 2 and 3. It is also seen that the effect of the average voltage for the third harmonic is related to the fact that during this sense period for the fundamental signal, there are two positive-going half cycles and one negative-going half cycle represented by the curve 4, in the third harmonic, with the result that the effect on the average voltage is related to one-third of the value of the third harmonic. By the same line of reasoning, a fifth harmonic should affect the average value of the wave form to the extent of one-fifth of the magnitude of the harmonic, etc., and the significance of the $n^{th}$ harmonic on the combined wave form is a function of $1/n$. If, however, the charge level of capacitors C1 in the circuits of FIGS. 1 and 2 can be established so that it corresponds to one-half of the time significance one half of a half wave or cycle of the third harmonic, as shown by the dashed horizontal line labeled X3 parallel to the horizontal axis of the curve of FIG. 3, it is seen that the diodes D1 in the circuit of FIGS. 1 and 2 need only to provide energy to charge the capacitors C1 for values more highly positive, but that no corresponding energy is taken from those capacitors by virtue of these diodes so that the charge is strictly a function of those voltage levels which exceed the level X as shown.

For the third harmonic, this procedure effectively cancels out one half section of each positive-going half wave of the third harmonic, so that we have one negative-going period or half wave and two half sections of positive-going periods or half waves providing canceling effects as to each other. It is seen, therefore, that the effect of the proper choice of the operating potential across capacitors C1 is such that the effect of the third order harmonic can be completely eliminated, and tests demonstrate this to be the case. To eliminate the fifth harmonic in the same manner, for example, the potential chosen across capacitors C1 for a balanced output circuit condition will be slightly lower than the value shown at X, as indicated by the dotted horizontal line labeled Y5, and it is therefore possible to choose a compromise value so that we can realize in effect an attenuation of the harmonic considerations approaching 6 to 1. The significance of the 7th, 9th and higher harmonics are of progressively less consequence by virtue of the face that their effect upon the average voltage is naturally reduced under any circumstances.

In a representative circuit used, the tests show that the effect of the third and fifth order harmonic could be substantially eliminated by relative selection of the values of associated circuit elements and the reference source so as to produce a DC voltage of approximately 71 and 44 percent, respectively, of the r.m.s. AC voltage input thereto and that a compromise value between these values would substantially eliminate the effect of both these harmonics since the significance of the harmonics is an inverse function of its order, the compromise used is between the third and fifth harmonic, and the higher harmonics create no problem. The theoretical value of the capacitor voltage as a percentage of the r.m.s. input would be:

$Vdc = 1.414 \ Vrms \ \sin 90°/N$ where "N" is the order of the harmonic in question.

The loading of any capacitor C1 in the circuits of FIGS. 1 and 2 is obtained by the connection of its junction with resistor R1 through the resistors R2 and R3 to a negative reference voltage which may be provided by a negative Zener diode Z1 as indicated. In the circuit of FIGS. 1 and 2, the reference Zener diode Z1 is operated at a current level high enough to avoid erratic action at the knee of the curve applicable thereto. An important feature of the parallel approach illustrated in FIG. 2 is that the same reference Zener diode functions for both overvoltage and undervoltage functions, avoiding the expense of individual Zeners for close tolerance, and enabling the use of an associated potentiometer to adjust to all three phases simultaneously. The output voltage in the circuits of FIGS. 1 and 2 as applied to each diode D2 poled as shown is determined by the voltage levels at the capacitors C1 which are positive, the voltage level of the negative Zener source and the respective value of resistors R2 and R3 forming a voltage divider. When their value are suitably chosen, the output voltages can be approximately zero at the junction point of the resistors R2 and R3, or some voltage close to zero as determined by the requirements of the subsequent logic. The effect of an increase in line voltage from the power source is such as to cause the output voltage applied to the diode D2 to go more highly positive. The voltage level at D3 is used in probing the same potential point, the junction of resistors R2 and R3, for operation of the undervoltage detection circuit UV where, of course, the poling of the diode D3 is the reverse of that of the diode D2. The voltage sensing as applied to the remaining phases of the 3-phase source of FIGURE 2 contain the equivalent of D2 and D3 function in effect upon the subsequent logic, and in the case of the undervoltage sensor UV, the lowest of all three potentials arising from diode D3, or the counterpart for the other phases, the selection determines the effect on the undervoltage logic. The diode D4, poled in the direction shown and having a suitable adjusted operating point, the output of which diode is connected to ground, is basically a clamp which is effective in keeping undesired voltages from the other elements of the logic circuitry.

If the capacitance values of the capacitors C1 are made large enough, the voltage sensor device is relatively insensitive to variations in frequency of the power source, because the signal output from C1 is effectively direct current (DC). This will, of course, affect the time constant of the sensor in some instances, but for most monitor purposes this is not a matter of particular concern. The circuit arrangements shown in FIG. 2 results in a sensor which selects the highest or lowest of the three phase voltages as required, to produce a DC analog of the output signal, compare this to a Zener or other reference establishing device and provide a net output for the subsequent logic which is relatively unaffected by both frequency and wave form.

The component values are so chosen in the circuit OV and UV that the output capacitor C2 and C3 quickly assumes a charge potential based on the analog output of the worst phase, that is, having the largest voltage variation. The charge decay time period is made considerably longer than the charge time period in each circuit so that the charge voltage on the output capacitor does not change significantly during a period of one cycle. By this means, the output is relatively constant permitting the subsequent logic to actuate time delay mechanism on the basis of the worst phase with little or no reaction to the other phases.

The capacitors C1 in the circuits of FIGS. 1 and 2 are preferably of the metallized type; the resistors R1, R2 and R3 of the miniaturized metal-film type; and the diodes D1 to D4 of the semiconductor type, to reduce the size and weight of the voltage sensor circuits and to prevent shifts in performance due to the methods employed in their preparation. Various other modifications of the voltage sensor and harmonic control circuits illustrated and described which are within the spirit and scope of the invention will occur to persons skilled in the art.

What is claimed is:

1. A circuit for sensing variations in the voltage of a multi-phase alternating current power source from a predetermined value comprising means for producing the direct current analog of each of the phase voltages adapted for connection across each phase of said source comprising circuit means including a common source of reference voltage; an input portion comprising as individual elements a first diode means, a first resistance means and a capacitor in series connected across a different one of the phases of said power source; a second and third resistance means in series forming a voltage divider connected from a first junction between said capacitor and said first resistance means to said common negative reference source; and output portion including a second and third diode means respectively connected to a second junction between said second and third resistance means; said first diode means being poled so that when said power source is connected thereto that diode means will positively rectify the applied phase voltage and produce a positive charge on said capacitor; said capacitor, said voltage divider and said common negative reference source being relatively proportioned thereby providing sensing of voltage independent of the waveform of the power source by effectively eliminating the effect of the third and fifth harmonics of the fundamental wave of the power source and approximately zero potential at said second junction when the applied voltage is of said predetermined value; said second diode means being poled so that when the voltage of said power source increases above said predetermined value that diode means will pass the positive voltage appearing at said second junction, said third diode means being poled so that when the applied voltage decreases below said predetermined value that diode means will pass the negative voltage appearing at said second junction; and logic circuit means connected in parallel to said second and third diode means of all said direct current analog means for indicating respectively the overvoltage and undervoltage conditions of said power source.

References Cited

UNITED STATES PATENTS

| | | | |
|---|---|---|---|
| 2,783,453 | 2/1957 | Rose | 328—146 X |
| 3,001,100 | 9/1961 | Schuh et al. | 317—31 |
| 3,037,151 | 5/1962 | Cimerman et al. | 317—31 |
| 3,311,907 | 3/1967 | Teal | 317—33 X |
| 3,313,984 | 4/1967 | Hupp | 317—31 X |
| 3,340,459 | 9/1967 | Fields et al. | 317—33 X |
| 3,076,901 | 2/1963 | Rubin et al. | 307—235 X |
| 3,188,526 | 6/1965 | Engel | 307—236 X |
| 3,193,759 | 7/1965 | Bogdan et al. | 307—237 X |
| 3,320,434 | 5/1967 | Ott | 307—236 X |

JOHN S. HEYMAN, Primary Examiner

U.S. Cl. X.R.

307—297, 235, 236; 321—16; 328—147